United States Patent
Sato et al.

(10) Patent No.: US 7,504,794 B2
(45) Date of Patent: Mar. 17, 2009

(54) PLANAR MOTOR

(75) Inventors: Hideaki Sato, Chiba-ken (JP); Kennosuke Kondo, Tokyo (JP)

(73) Assignee: Chiba Precision Co., Ltd., Chiba-ken (JP)

( * ) Notice: Subject to any disclaimer, the term of this patent is extended or adjusted under 35 U.S.C. 154(b) by 102 days.

(21) Appl. No.: 11/605,376

(22) Filed: Nov. 29, 2006

(65) Prior Publication Data

US 2008/0122397 A1    May 29, 2008

(51) Int. Cl.
*H02K 41/02*    (2006.01)
*B64C 17/06*    (2006.01)

(52) U.S. Cl. .................. 318/649; 318/687; 318/671; 318/135; 318/592; 318/593; 318/38; 310/12; 414/935

(58) Field of Classification Search ........... 318/649, 318/687, 671, 592, 593, 135, 38; 310/12; 414/935
See application file for complete search history.

(56) References Cited

U.S. PATENT DOCUMENTS

| | | | | |
|---|---|---|---|---|
| 4,823,062 A | * | 4/1989 | Hoffman et al. ........... | 318/687 |
| 4,893,071 A | * | 1/1990 | Miller ........................ | 324/660 |
| 4,956,833 A | * | 9/1990 | Kokado et al. ........... | 369/44.41 |
| 4,958,115 A | * | 9/1990 | Miller ........................ | 318/662 |
| 5,777,402 A | * | 7/1998 | Chitayat ..................... | 310/12 |
| 6,175,169 B1 | * | 1/2001 | Hollis et al. ................. | 310/12 |
| 6,271,606 B1 | * | 8/2001 | Hazelton .................... | 310/12 |
| 6,949,845 B2 | * | 9/2005 | Oisugi et al. ............... | 310/12 |
| 7,059,188 B2 | * | 6/2006 | Okada ..................... | 73/504.02 |
| 7,363,814 B2 | * | 4/2008 | Okada ..................... | 73/504.04 |

FOREIGN PATENT DOCUMENTS

| | | |
|---|---|---|
| JP | 2002-341942 A | 11/2001 |
| JP | 2005-077280 A | 3/2005 |
| JP | 2005-168154 A | 6/2005 |

* cited by examiner

*Primary Examiner*—Rita Leykin
(74) *Attorney, Agent, or Firm*—Venable LLP; Michael A. Sartori; Catherine M. Voorhees

(57) ABSTRACT

A common electrode plate formed on a common electrode base attached to the lower surface of the movable stage faces a split electrode plate formed on a split electrode base attached to the upper surface of a main base, which are apart from each other at a predetermined interval. A support mechanism formed of ball bearings, ball stoppers at the movable side, steel balls, ball stoppers at the fixed side, and ball bearings allows the movable stage to move in directions of the X-axis, Y-axis and turning. A linear actuator 19 is driven to move the movable stage in the directions of X-axis, Y-axis, and turning.

7 Claims, 9 Drawing Sheets

(a)

(b)

(c)

(a)

(b)

PLANAR MOTOR

BACKGROUND OF THE INVENTION

1. Field of the Invention

The present invention relates to a planar motor used for a fine positional control of a stage of an optical microscope, for example.

2. Description of the Related Art

As a device for two-dimensionally driving a subject in X-Y directions so as to be positioned, an X-Y stage structured by combining a servo motor with a linear guide is well known.

As the aforementioned X-Y stage, an XYθ stage for linearly moving and turning the stage has been proposed, in which three sides of a square table are provided with linear actuators, respectively and output shafts of the respective linear actuators are connected to the corresponding sides of the square table (Japanese Unexamined Patent Application Publication No. 2002-341942).

In the aforementioned XYθ stage, the driving force is constantly applied to one of the connection parts of inclined linear guides even when only a first or second driving unit is driven by providing an inclination angle between the linear guide directions of the respective linear guides functioning as the direction motion guiding member connected with two linear actuators functioning as a pair of first driving units. The driving force is applied to at least two connection parts together with the connection part connected with the driving unit to supply the driving force with sufficient balance.

The XYθ stage is of semi-close control type having its linear actuator driven by, for example, a stepping motor for controlling movement positions of the X-axis and Y-axis, and the turning angle in accordance with the pulse number. As the accurate positional control is likely to be influenced by precisions of the parts that constitute the transmission mechanism and by the backlash upon transmission of the driving force, it is difficult for such XYθ stage of semi-close control type to achieve the highly accurate positioning.

The planar motor for controlling directions of the X-axis and Y-axis, and the turning angle has been proposed by the applicant of the present invention (Japanese Unexamined Patent Application Publication No. 2005-168154). According to the disclosure, the permanent magnet for the linear motor is attached to the movable stage, and a coil for linear motor is attached to the fixed stage, and electricity is applied to the coil to constitute the coreless linear motor that moves the movable stage in the directions of the X-axis, Y-axis, and θ. A cross-shaped common electrode is mounted on the movable stage, and a pair of fixed electrodes is provided to each end of the cross-shaped common electrode. Each displacement in the directions of the X-axis, Y-axis and θ is derived from the respective displacements in the electrostatic capacities of the capacitors formed between the cross-shaped common electrode and the fixed electrode. The positioning control in the directions of X-axis, Y-axis and θ may be executed based on the derived displacements in the respective directions.

According to the disclosure, the planar motor of thin and low vibration type is capable of executing a highly accurate positioning.

Unlike the generally employed motor, the planar motor disclosed in Japanese Unexamined Patent Application Publication No. 2005-168154 is suitable for the use in the device that requires accurate position control as it is capable of executing highly accurate positioning. In the case where the external force is applied to the stage although such force is relatively small, the stage is likely to move. As it is not intended to move the movable stage with relatively large force, it is unsuitable for the use as the mechanism for moving the stage that is required to have both accurate position control and the thrust force.

The use of a plurality of linear actuators may be considered to drive the movable stage in directions of the X-axis, Y-axis and θ so as to be moved with a large force. Because of the error in the combined parts or the backlash of the transmission mechanism which may influence the positioning control, and the semi-closed control mode, it is difficult for the aforementioned planar motor to establish the highly accurate position control.

SUMMARY OF THE INVENTION

Accordingly, it is an object of the present invention to provide a planar motor that forms the stage movable in directions of the X-axis, Y-axis and θ of fully closed control mode, which is intended to improve the thrust force for moving the movable stage, and after the movement of the movable stage, to prevent the movement caused by the external force for realizing the highly accurate positional control without requiring the precision of the combined parts.

In the embodiment of the present invention, a planar motor includes a movable stage, a common electrode plate including an electrode block in a crisscross arrangement to move on a plane together with the movable stage, a split electrode plate apart from the common electrode plate at a predetermined interval, which is formed of a plurality of pairs of electrode blocks that face the electrode blocks of the common electrode plate, a main base to which the split electrode plate is attached, a plurality of linear actuators attached to the main base, and a transmission mechanism that transmits displacement amounts of output shafts of the plurality of the linear actuators. A differential structure is provided in which electrostatic capacities of two capacitors formed of a pair of the electrode blocks of the split electrode plate, which face the electrode blocks of the common electrode plate are kept unchanged with respect to a movement in an axial direction of the capacitors, and one of the electrostatic capacities is increased while the other is decreased in proportion to a displacement of the movement with respect to the other axial direction. The plurality of linear actuators are driven to perform one of driving the movable stage in a direction of an X-axis and a Y-axis, and of turning the movable stage so as to output a change in the electrostatic capacity between the split electrode plate and the common electrode plate in accordance with the movement of the movable stage.

According to the embodiment, the transmission mechanism includes a bearing attached to an output shaft of the linear actuator having a turning axis vertical to the plane on which the movable stage moves, a bearing guide attached to the movable stage, against which the bearing is pressed, and an elastic member set between the main base and the bearing guide to apply an urging force that presses the bearing against the bearing guide.

According to the embodiment, four units of the linear actuators are used, which are arranged at each side end of the main base. The bearing guide is attached to each of four ends of the movable stage corresponding to the four respective linear actuators, and the bearing attached to each of the output shaft of the four linear actuators abuts against the bearing guide attached to each of the four ends of the movable stage.

According to the embodiment, two opposite linear actuators among the four linear actuators are arranged symmetrically with respect to a center of the main base to have the output shafts opposite with each other. When the output shafts of the two opposite linear actuators are driven in a same direction, the movable stage is linearly moved in one of directions of X-axis and Y-axis, and when the output shafts are driven in opposite directions, the movable stage is turned.

According to the embodiment, at least a portion of a comparative arithmetic circuit is provided for calculating displacements in directions of X-axis, Y-axis and turning based on the electrostatic capacity of all the capacitors formed between the common electrode plates and the split electrode plates. A positional control with respect to the directions of X-axis, Y-axis and turning is executed based on each displacement output from the comparative arithmetic circuit.

According to the embodiment, at least a portion of a comparative arithmetic circuit is provided for calculating displacements in directions of X-axis and Y-axis based on the electrostatic capacity of all the capacitors formed between the common electrode plates and the split electrode plates. A positional control with respect to the directions of X-axis and Y-axis is executed based on each displacement output from the comparative arithmetic circuit.

The aforementioned structure is capable of providing a large thrust force to move the movable stage, and executing the highly accurate position control without requiring high precision processing with respect to the respective parts that constitute the planar motor. The fully closed loop control may be realized by feed-backing the outputs of the comparative arithmetic circuit. This makes it possible to execute accurate control of the respective directions on the plane surface. Further, after the position control of the movable stage is finished, such position is not easily moved even by the large mechanical force externally applied thereto, resulting in the highly reliable stage for the optical microscope.

DESCRIPTION OF THE PREFERRED EMBODIMENTS

Figure 1:
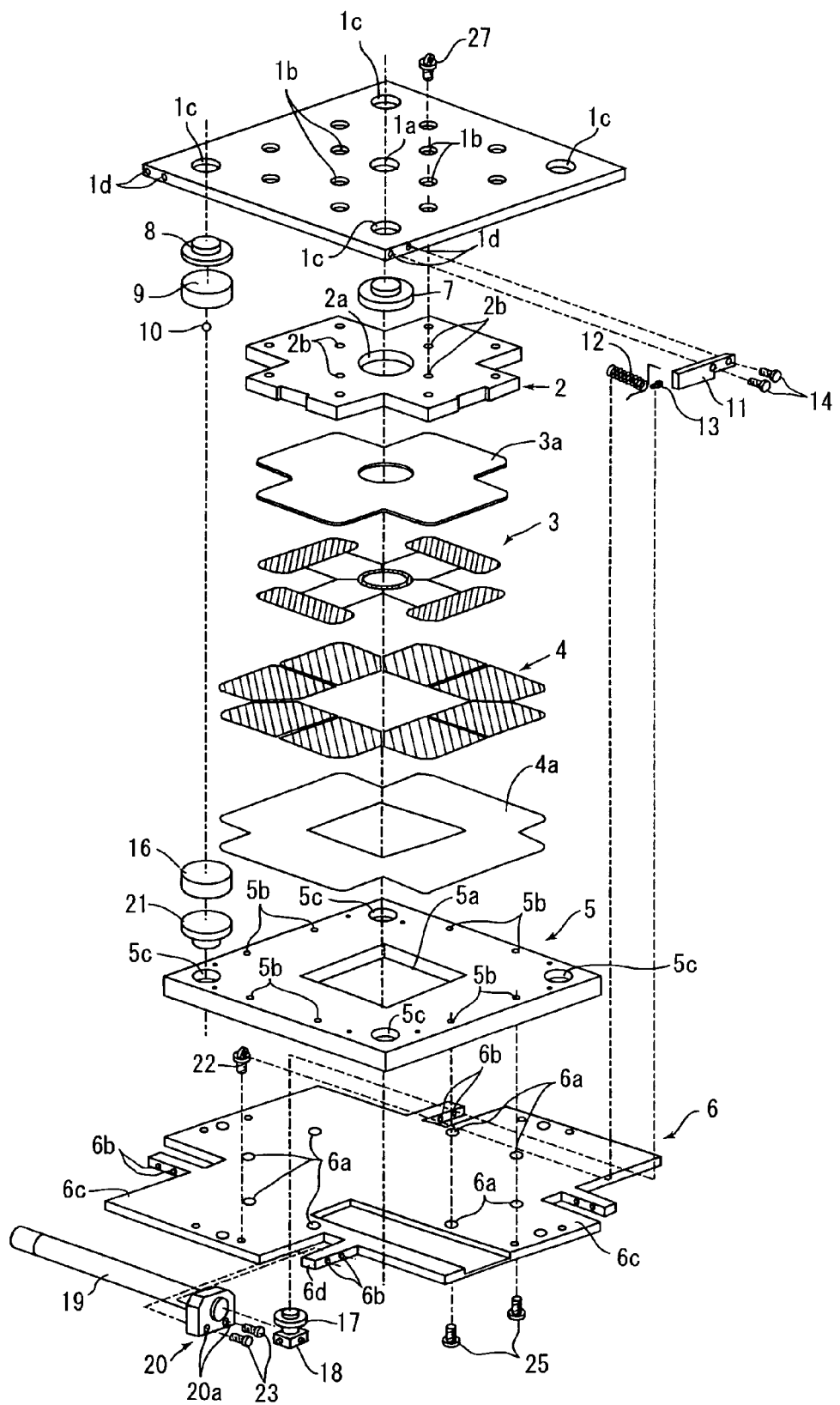
FIG. 1 is a schematic exploded view of a planar motor according to an embodiment of the present invention.

An embodiment of the present invention will be described in detail referring to the drawings.

FIG. 1 is a schematic exploded view of a planar motor according to the embodiment of the present invention. The embodiment includes a linear actuator mechanism having four linear actuators 19 each attached to an opposite side surface of a main base 6 as a fixed stage for moving the movable stage 1 in directions of the X-axis, Y-axis, and for turning it, and an electrostatic capacity displacement sensor formed of a cross-shaped common electrode plate 3 attached to the movable stage 1, and a split electrode plate 4 attached to the main base 6, which faces the respective ends of the common electrode plate 3.

A center hole 1a is formed through the center of the movable stage 1 of the metal plate so as to allow insertion of a centering pin 7 therethrough, around which four holes 1b are formed. Four holes 1c are further formed at the respective corners of the movable stage 1 for the purpose of movably supporting the movable stage 1. A pair of screw holes 1d are also formed through the respective sides of the movable stage 1 for fixing bearing guides 11.

A cross-shaped common electrode base 2 is formed of a metal, and has its back surface provided with a glass material 3a. The common electrode plate 3 including four island-like electrode blocks is chrome-plate deposited on the back surface of the glass material 3a crosswise. A hole 2a is formed through the center of the common electrode base 2, around which four screw holes 2b are formed. Each screw 27 is inserted into each of the four holes 1b formed through the movable stage 1 so as to be screwed with the corresponding screw hole 2b formed through the common electrode base 2. The common electrode base 2 to which the common electrode plate 3 is attached is then fixed to the movable stage 1. In the aforementioned state, the centering for attaching the common electrode base 2 is performed by inserting the centering pin 7 from the hole 2a into the hole 1a.

Eight holes 6a are formed through the main base 6 formed of a metal plate for attaching the split electrode base 5, and a pair of screw holes 6b (12 holes in total) are also formed through the respective sides of the main base 6 for fixing the linear actuators 19. Although not shown in FIG. 1, a groove 6e (see FIG. 2) is formed on the upper surface of the main base 6 for guiding the lead wire outward from the respective preamplified electrodes.

Figure 4:
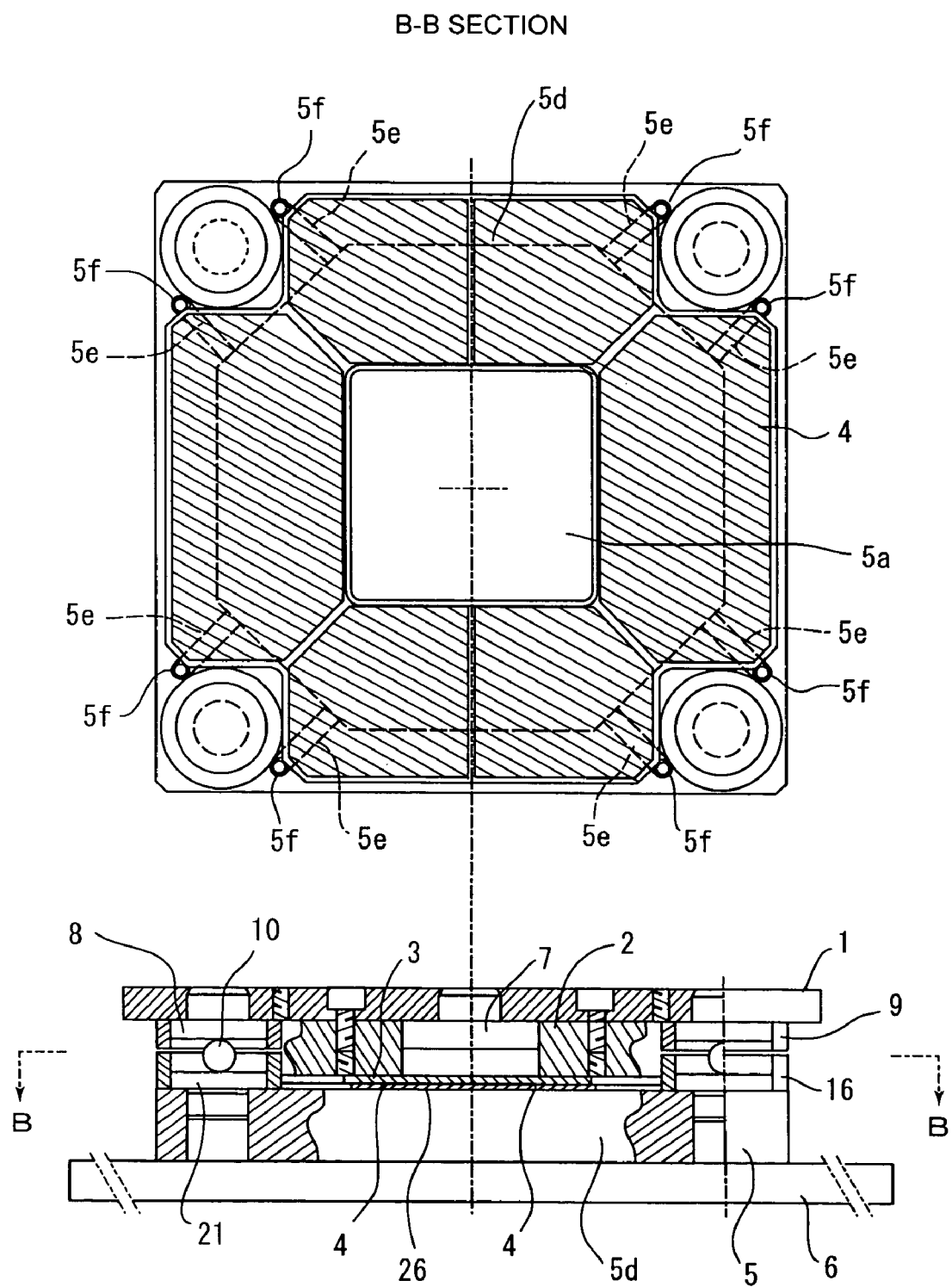
FIG. 4 shows a cross-section taken along line B-B and the side view thereof when seen below from the split electrode plate.

The split electrode base 5 is formed of a metal, and has its upper surface provided with a glass material 4a. A split electrode plate 4 is chrome-plate deposited on the upper surface of the glass material 4a. A square through hole 5a is formed through the center of the split electrode base 5, and eight screw holes 5b are formed along the respective sides. Four holes 5c are further formed at the respective corners for the purpose of movably supporting the movable stage 1. Screws 25 are inserted into those eight holes 6a formed through the main base 6, respectively to be screwed with the screw holes 5b of the split electrode base 5 to which the split electrode plate 4 is attached, which is then fixed to the main base 6. The common electrode plate 3 and the split electrode plate 4 face with each other at a predetermined interval 26 as shown in FIG. 4.

An octagonal recess portion 5d is formed on the lower surface of the split electrode base 5, four pairs of sides of which each facing with each other are connected to two lead wire grooves 5e, respectively. Each end of the connected lead wire grooves 5e is further connected to a hole 5f formed toward the surface of the split electrode plate 4 (see FIG. 4).

The octagonal recess portion 5d accommodates a preamplifier (not shown). The lead wire connected to the common electrode plate 3, and eight lead wires connected to the respective split electrodes are guided to the octagonal recess portions 5d through the hole 5a, and through the respective holes 5f and lead wire groove 5e, respectively. Outputs (capacity voltage) of the capacitor formed of each of the respective split electrodes and the common electrode are input to the preamplifier so as to be amplified. The amplified outputs of the preamplifier is drawn to the outside from the groove 6e of the main base 6 connected to the recess portion 5d.

The mechanism for movably supporting the movable stage 1 on the plane surface is formed of ball bearings 8 each provided at four corners between the movable stage 1 and the split electrode base 5, ball stoppers 9 at the movable side, steel balls 10, ball stoppers 16 at the fixed side, and ball bearings 21.

The ball bearing 8 is inserted into one of the holes 1c formed through four corners of the movable stage 1 so as to be fit with the ball stopper 9 at the movable side. Meanwhile, the ball bearing 21 is inserted into one of the holes 5c formed through four corners of the split electrode base 5 so as to be fit with the ball stopper 16 at the fixed side. In this state, the steel balls 10 are put into the ball stoppers 16 at the four respective corners for attaching the movable stage 1 such that the ball stoppers 9 at the four respective corners of the movable stage 1 face the ball stoppers 16 at the four corners, respectively.

Figure 3:
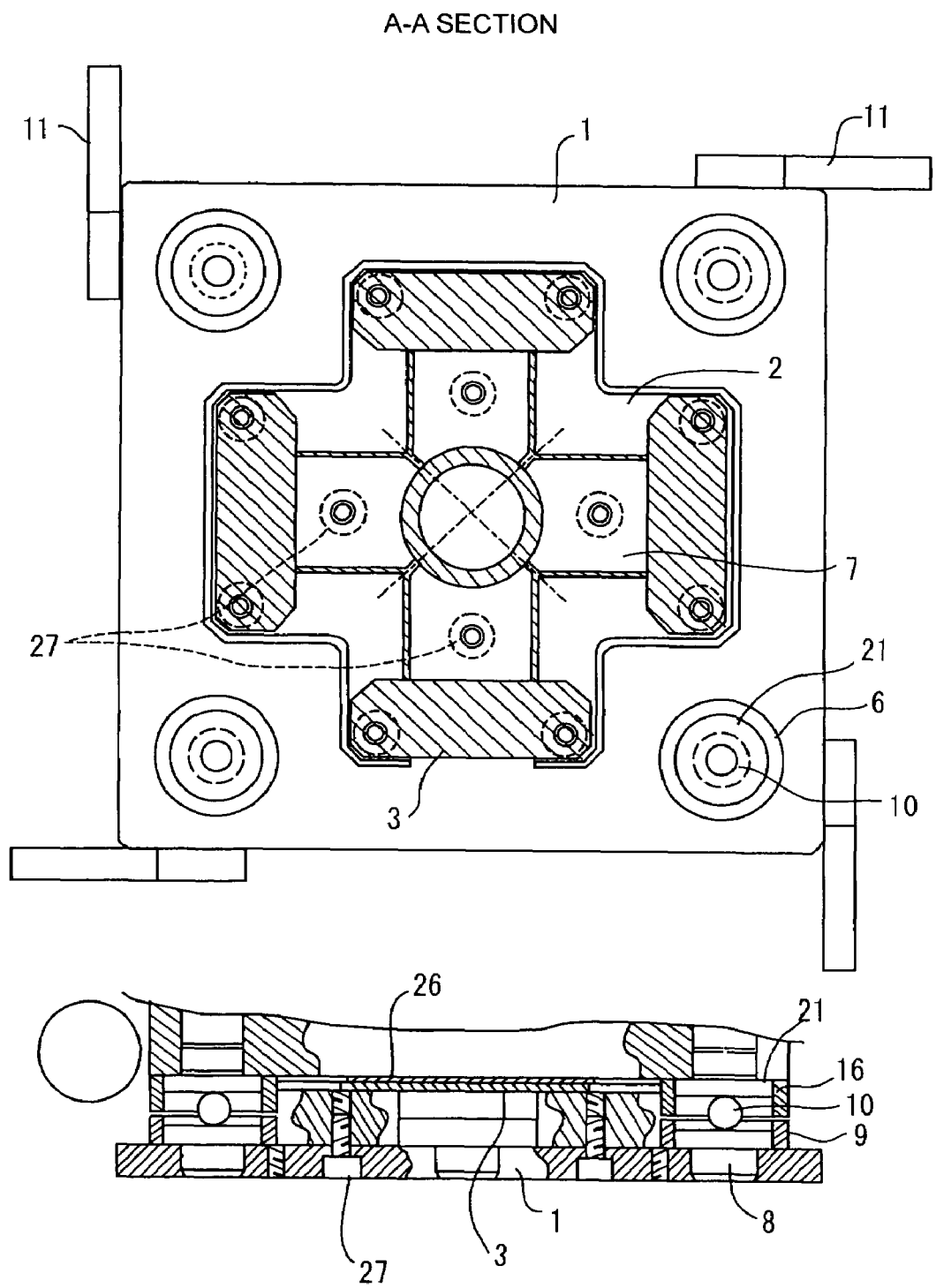
FIG. 3 shows a cross-section taken along line A-A of the side view shown in FIG. 2, and the side view thereof when seen above from the common electrode plate.

As the movable stage 1 is urged by four tension springs 12 (described later) against the split electrode base 5, it is movably supported thereon while interposing the four steel balls 10 within the respective ball stoppers. The thus assembled support mechanism is shown in the side views of FIGS. 3 and 4.

The island-like electrode blocks (terminals) of the common electrode plate 3 face pairs of electrodes of the split electrode plates 4 (see FIG. 7(a)). Each space between the respective electrode blocks of the common electrode plate 3 and the pairs of electrodes of the split electrode plate 4 is kept at a predetermined interval such that the capacitor (capacity) is formed by the respective electrodes of the split electrode plates 4 and the respective electrode blocks of the common electrode plate 3. This makes it possible to allow the movable stage 1 to move freely within the required range (directions of X-axis, Y-axis, and θ (turning)) on the split electrode base 5.

Figure 2:
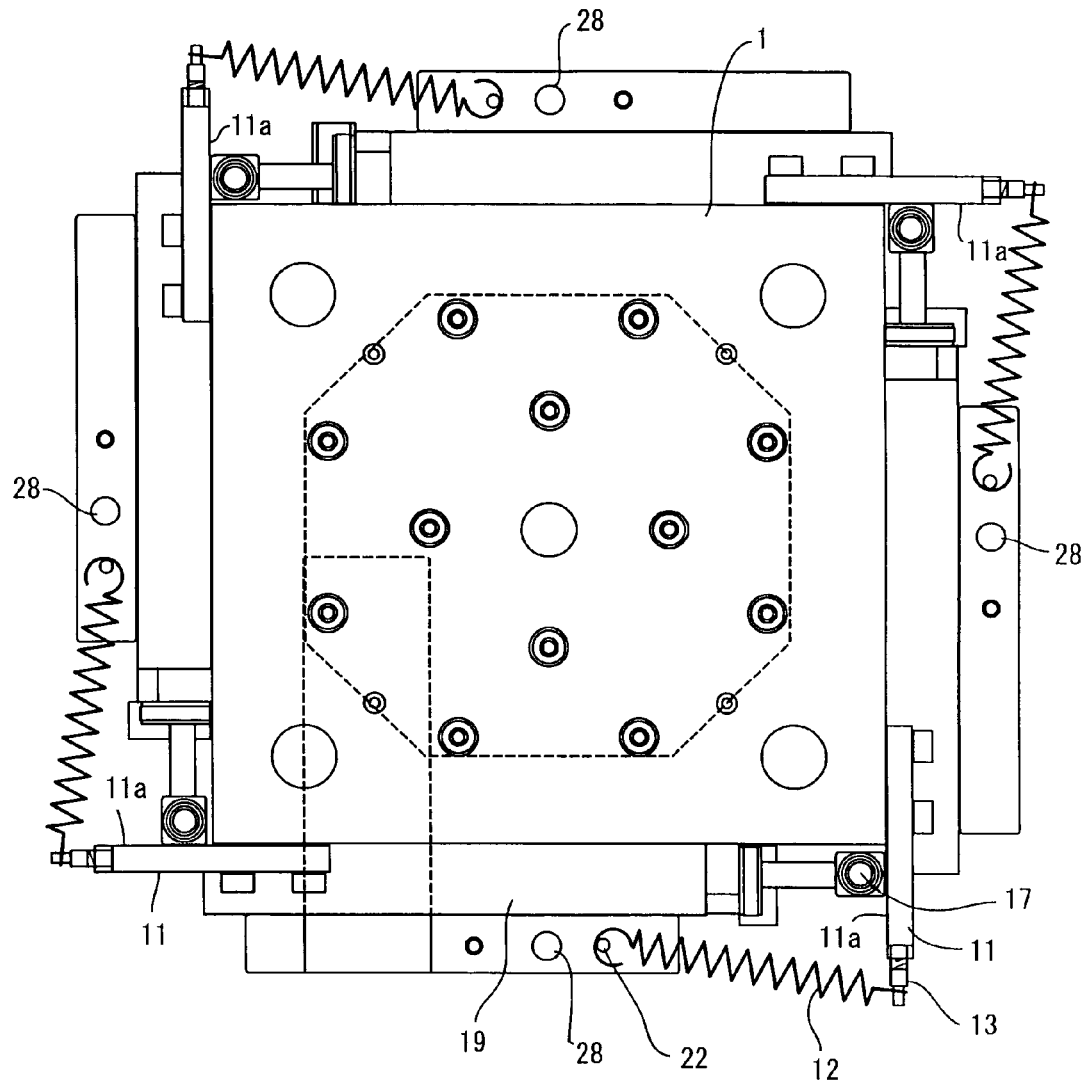
FIG. 2 shows a plan view and a side view of the planar motor according to the embodiment of the present invention.
Figure 2:
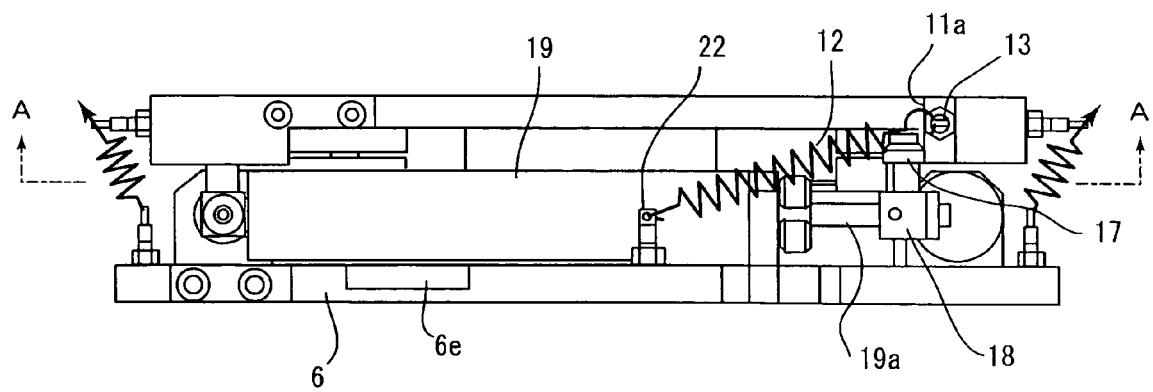

The structure of the linear actuator mechanism will be described referring to FIG. 2. The linear actuator mechanisms are provided near the respective side ends of the main base 6. The main base 6 includes mount portions 6c on which the linear actuators 19 are mounted at the respective side ends, and protrusions 6d each having two holes 6b formed therethrough. A motor bracket 20 with two screw holes 20a is attached to the linear actuator 19. Screws 23 are inserted into the two holes 6b so as to be screwed with the screw holes 20a of the motor bracket 20. The linear actuator 19 is thus fixed to the main base 6. The linear actuator 19 at the opposite side end is also fixed. The bearing holder 18 is attached to a rod 19a of the linear actuator 19 with the screw, and the bearing 17 is attached to the tip of the bearing holder 18.

Meanwhile, a bearing guide 11 for guiding a bearing 17 in abutment thereagainst is screwed into the screw holes 1d formed through the side surface of the movable stage 1 using screws 14. A tension spring post 13 is embedded in an end portion of the bearing guide 11. When the movable stage 1 is assembled with the split electrode base 5, one end of the tension spring 12 is engaged with the tension spring post 13, and the other end is engaged with a tension spring post 22 screwed with the main base 6.

In this way, the tension spring 12 provided between the tension spring posts 13 and 22 allows the bearing 17 attached to the bearing holder 18 to be urged against a surface 11a of the bearing guide 11, and the movable stage 1 to be urged against the split electrode base 5. Bolts 28 near the respective tension spring posts 22 are used to fix the planar motor to an enclosure (not shown).

The four linear actuator mechanisms drive the rod 19a of one of two opposite linear actuators 19 forward, and reverse the rod 19a of the other linear actuator 19 such that the movable stage 1 is moved in the direction of either X-axis or Y-axis. In this case, the tension spring 12 set at the linear actuator 19 with the advanced rod 19a further extends, and the tension spring 12 set at the linear actuator 19 with the reversed rod 19a contracts. Then the position of the movable stage 1 is regulated so as not to be moved by the extended or contracted tension spring 12 after the movement in the direction of X-axis or Y-axis. The bearings 17 at the ends of the two linear actuators 19 at the non-driven side are turned at the surface 11a of the bearing guide 11, and the tension spring 12 is maintained without being extended nor contracted such that the position of the movable stage 1 after the movement is not moved from the four directions. The movable stage 1 is therefore not easily moved under the external pressure.

The movable stage 1 may be turned by extending or contracting the rods of the four linear actuators 19 such that the position of the movable stage 1 is not easily moved by the action of four tension springs 12 after the rotation.

Figure 5:
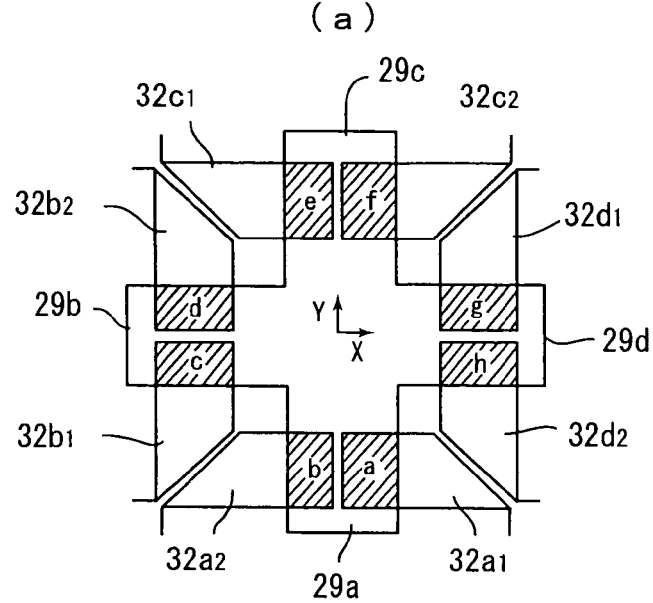
FIG. 5a, 5b, 5c two-dimensionally shows configuration and arrangement of electrodes for the electrostatic capacity sensor which detects directions of the X-axis and Y-axis.
Figure 5:
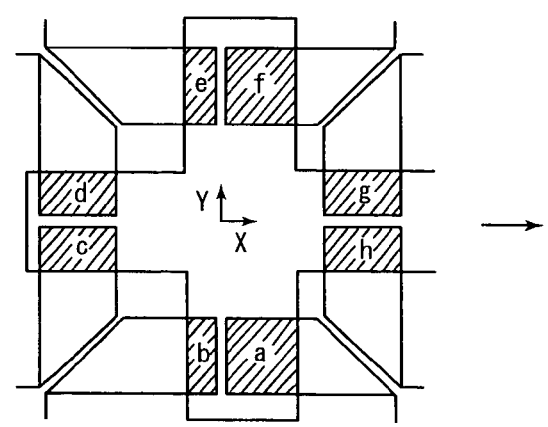
Figure 5:
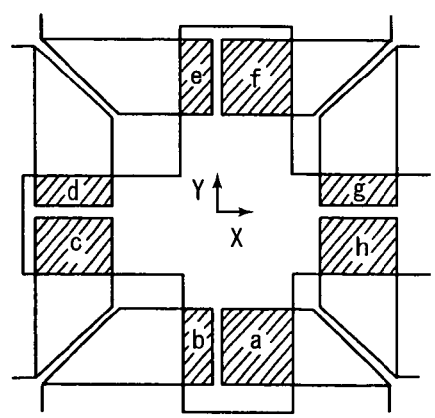

FIGS. 5(a), 5(b) and 5(c) are two-dimensional views each showing the configuration and arrangement of electrodes for the electrostatic capacity sensor for detecting the directions of X-axis and Y-axis. The cross-shaped configuration of the common electrode plate shown in the drawing is different from that of the common electrode plate shown in FIG. 1.

Eight split electrodes $32a_1$, $32a_2$ to $32d_1$, and $32d_2$ are disposed on the split electrode base to face a common electrode plate 29 of the movable stage 1 in parallel therewith at a predetermined space. Four pairs of capacitors, each pair of which includes two capacitors, that is, eight capacitors in total are formed between electrode blocks 29a, 29b, 29c, 29d, and corresponding pairs of the split electrodes $32a_1$ and $32a_2$, $32b_1$ and $32b_2$, $32c_1$ and $32c_2$, and $32d_1$ and $32d_2$, respectively. The electrostatic capacity of each of the capacitors changes in accordance with the displacement of the common electrode plate 29, realizing the electrostatic capacity sensor.

The shaded portions shown in FIGS. 5(a), 5(b), and 5(c) indicate areas of the overlapped portions of the common electrode plate 29 and the respective split electrodes $32a_1$, $32a_2$ to $32d_1$, and $32d_2$. Each area is proportional to the electrostatic capacity of the capacitor each formed by the respective electrodes.

FIG. 5(a) shows that the movable stage 1 is at a zero position with respect to the X- and Y-axes, and each electrostatic capacity of those eight capacitors is the same.

FIG. 5(b) shows that the movable stage 1 has moved from the zero position toward the positive X-axis direction to show the differential structure in which among two pairs of the split electrodes $32a_1$, $32a_2$ and $32c_1$, $32c_2$ along the X-axis direction, the electrostatic capacity corresponding to the electrodes $32a_1$ and $32c_2$ is increased, and the one corresponding to the other electrodes $32a_2$ and $32c_1$ is decreased. Meanwhile, each electrostatic capacity for two pairs of the split electrodes $32b_1$, $32b_2$, and $32d_1$, $32d_2$ arranged along the Y-axis direction is not changed.

FIG. 5(c) shows that the movable stage 1 has moved from the position shown in FIG. 5(b) to the Y-axis direction. The respective electrostatic capacities of the two pairs of split electrodes arranged in the X-axis, that is, $32a_1$, $32a_2$, and $32c_1$, $32c_2$ are not changed. Meanwhile, the electrostatic capacities of the split electrodes arranged in the Y-axis, that is, $32b_1$, $32b_2$, and $32d_1$, $32d_2$ are differentially changed.

The common electrode is formed into a crisscross shape to form the electrostatic capacity sensor in accordance with displacement of the movable stage in directions of the X-axis and Y-axis.

Figure 6:
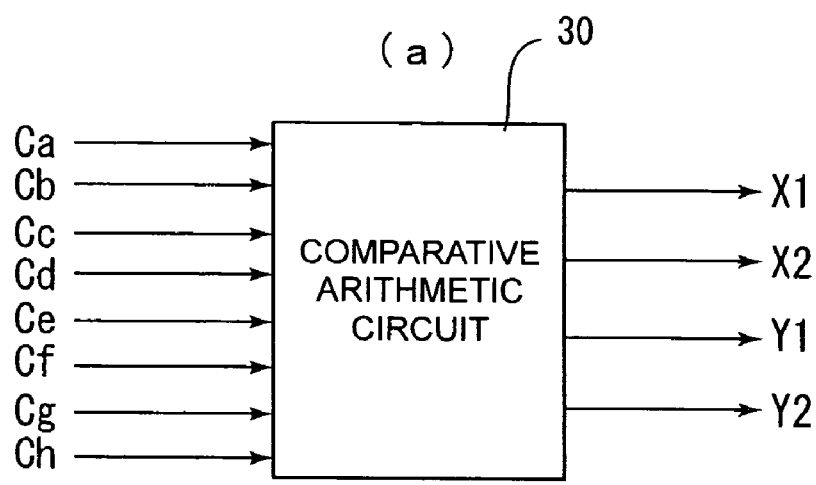
FIG. 6a, 6b shows operations of the comparative arithmetic circuit.
Figure 6:
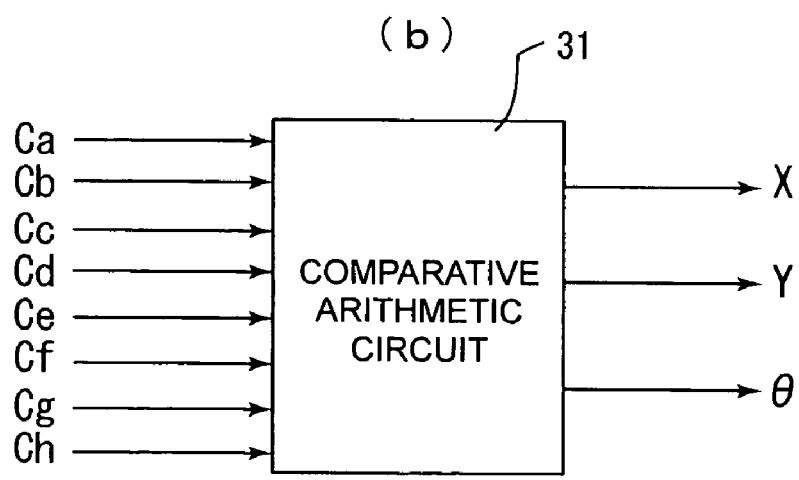

FIG. 6 shows block diagrams each showing the comparative arithmetic circuit for obtaining the movement on the plane surface in response to the electrostatic capacity change.

A comparative arithmetic circuit 30 shown in FIG. 6(a) calculates displacement amounts of both X-axis and Y-axis using the following equations (1) to (4) based on outputs of four pairs, that is, eight differentially structured electrostatic capacity sensors, that is, Ca to Ch. The comparative arithmetic circuit uses the arithmetic expression (each change in the electrostatic capacities of a pair of differentially operating capacitors may be derived from the equation $V_0=(Ca-Cb)/(Ca+Cb)$) as disclosed in Japanese Unexamined Patent Application Publication No. 2005-77280.

$$X1=(Cb-Ca)/(Ca+Cb+Cc+Cd+Ce+Cf+Cg+Ch) \quad (1)$$

$$X2=(Ce-Cf)/(Ca+Cb+Cc+Cd+Ce+Cf+Cg+Ch) \quad (2)$$

$$Y1=(Cc-Cd)/(Ca+Cb+Cc+Cd+Ce+Cf+Cg+Ch) \quad (3)$$

$$Y2=(Ch-Cg)/(Ca+Cb+Cc+Cd+Ce+Cf+Cg+Ch) \quad (4)$$

The displacement amount of the respective pairs of sensors derived from the comparative arithmetic calculation may be set as the feedback signal so as to allow the respective linear actuators to be positional controlled independently in directions of the X-axis and Y-axis with respect to the respective sensors (four pairs of electrostatic capacity sensors).

A comparative arithmetic circuit 31 shown in FIG. 6(b) calculates the respective displacement amounts in directions of the X-axis, Y-axis, and angle around the axis, that is, θ using the following equations (5) to (7) based on outputs of the differentially structured eight electrostatic capacities Ca to Ch. In this case, the feedback signal is used for integrated control with coordinate conversion instead of independent control for the purpose of improving the control performance. This may further improve the positional control performance of the planar motor because the interference of the respective axes may be corrected compared to the independent control.

Figure 7:
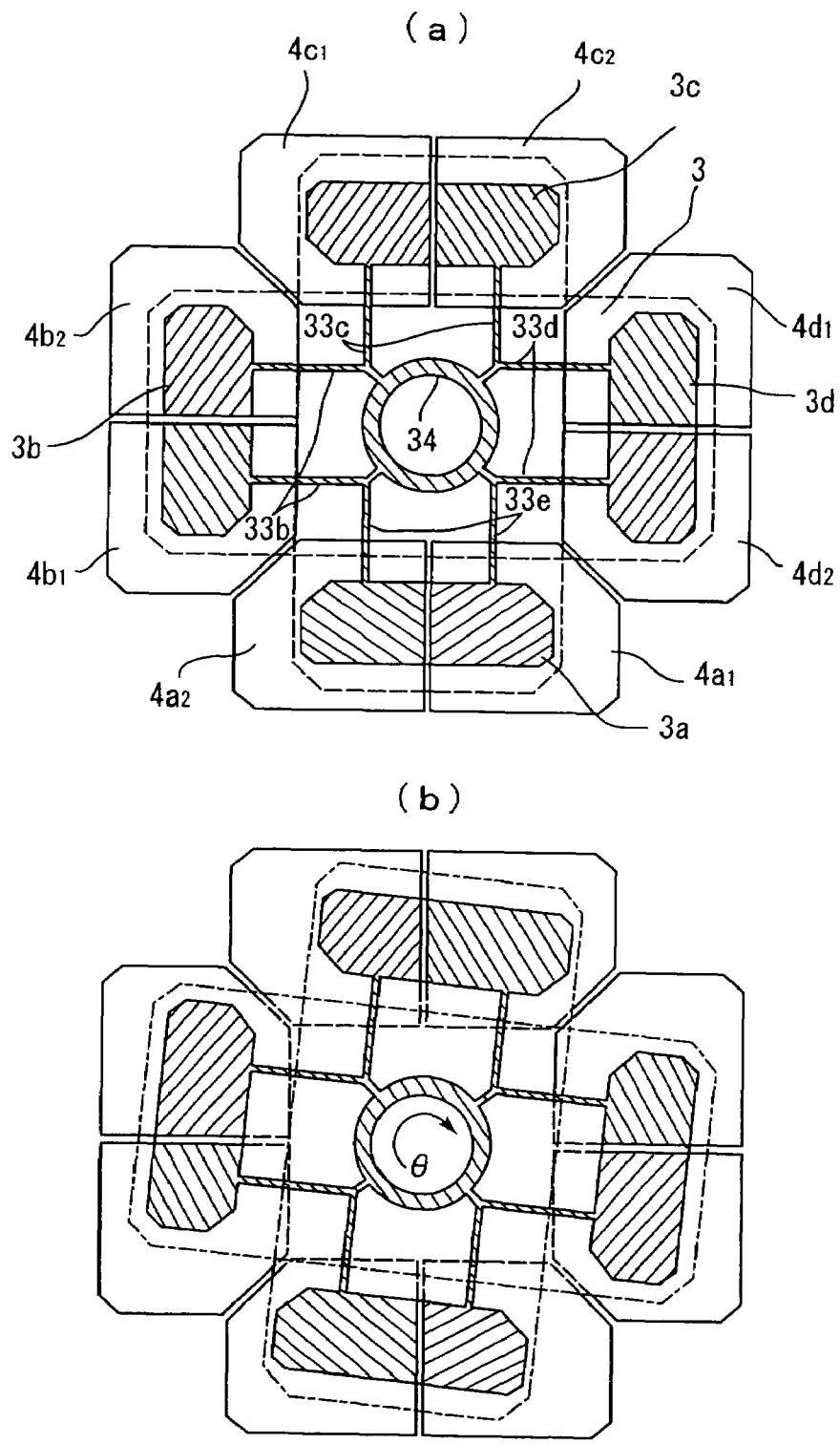
FIG. 7a, 7b shows the island-like common electrode having electrode blocks to which the comparative arithmetic circuit 31 shown in FIG. 6(b) is applied.

FIG. 7 shows the common electrode of the island-like electrode blocks shown in FIG. 1, which allows the comparative arithmetic circuit 31 shown in FIG. 6(b) to be applied. The common electrode plate 3 is formed of the island-like electrode blocks 3a to 3d formed on the common electrode base 5, a annular pattern 34 disposed at the center of the common electrode base 5, and linear patterns 33a to 33d each for connecting the respective ends of the electrode blocks 3a to 3d to the annular pattern 34.

The electrode blocks 3a to 3d of the common electrode plate 3 are arranged like islands, and each shaded area of the overlapped portions of the electrode blocks 3a to 3d and the split electrodes $4a_1$, $4a_2$ to $4d_1$, and $4d_2$ is kept unchanged even if the movable stage 1 is moved in the directions of X-axis and Y-axis, and turned as shown in FIG. 7(a). This makes it possible to keep the total value (the denominator of the following equation (7)) of electrostatic capacities of eight capacitors. Accordingly, the comparative arithmetic calculation in the case shown in FIG. 6(b) may be performed.

$$X=X1+X2 \quad (5)$$

$$Y=Y1+Y2 \quad (6)$$

$$\theta=[(Cb+Cd+Cf+Ch)-(Ca+Cc+Ce+Cg)]/(Ca+Cb+Cc+Cd+Ce+Cf+Cg+Ch) \quad (7)$$

The positional control of the movable stage 1 in directions of the X-axis, Y-axis, and turning may be thus performed.

Figure 8:
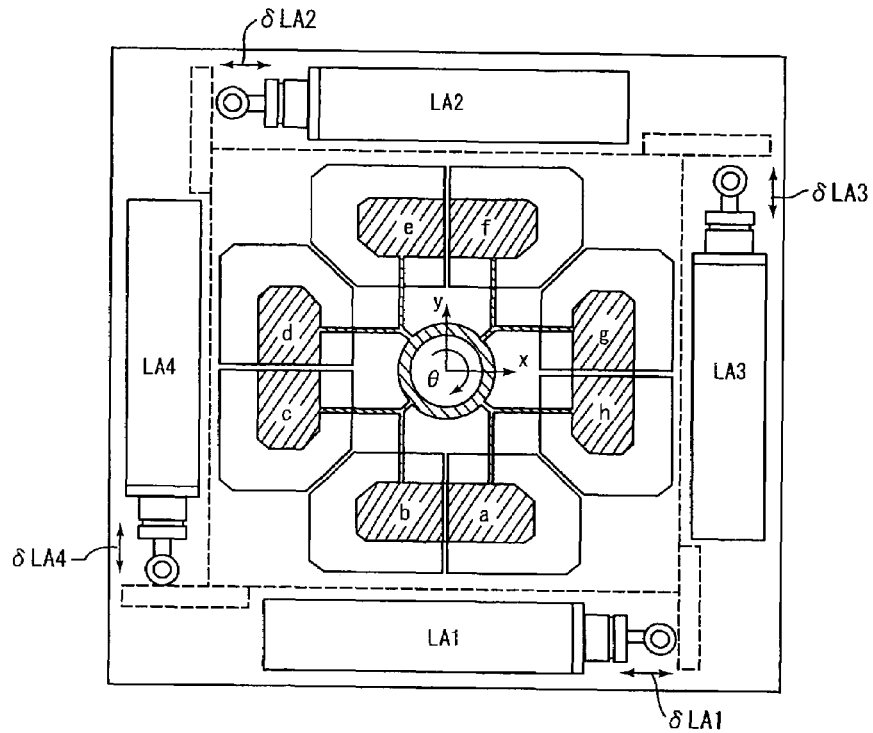
FIG. 8a, 8b shows the feedback circuit for an integrated control of the planar motor according to the embodiment of the present invention.
Figure 8:
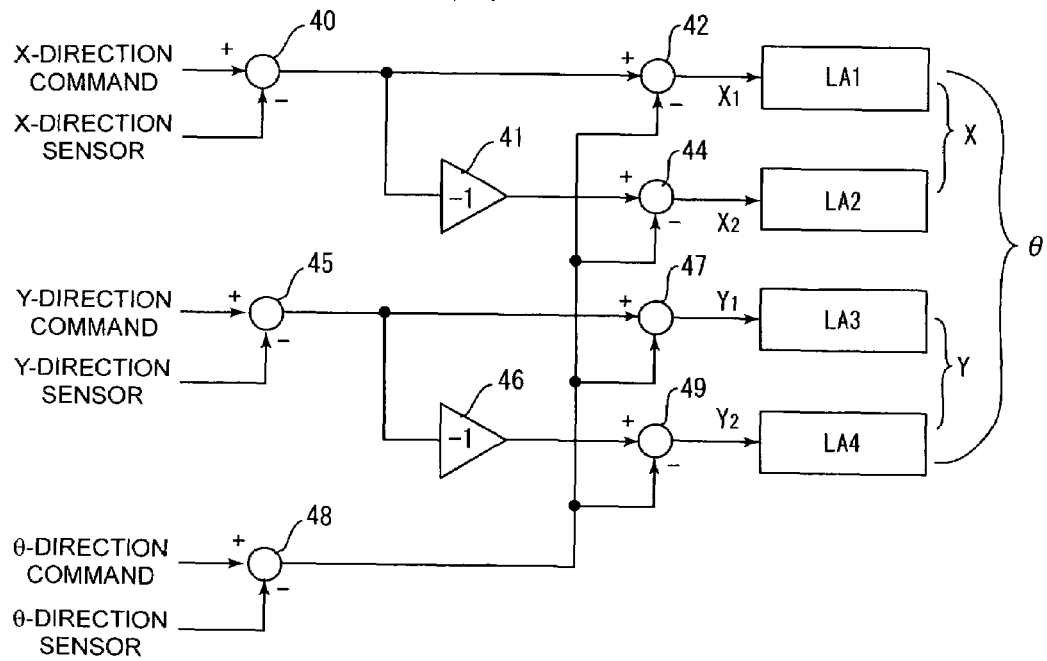

FIG. 8 shows the feedback circuit for the integrated control of the planar motor according to the embodiment of the present invention. Assuming that the linear actuators 19 arranged outside the respective split electrodes are designated as LA1, LA2, LA3, and LA4, and the displacement amounts thereof are designated as δLA1, δLA2, δLA3, and δLA4 as shown in FIG. 8(a), the movements in directions of the x, y and θ (the clockwise direction when seen from the upper surface of the stage is set as the positive direction) may be expressed as δLA1 −δLA2, δLA3 −δLA4, and −(δLA1+δLA2+δLA3+δLA4), respectively. The aforementioned equations correspond with the equations (5), (6) and (7). The code "+" for the "δLA" denotes the advance movement of the axis of the linear actuator, and "−" denotes the reverse thereof, respectively.

In the circuit shown in FIG. 8(b), a x-direction command and a signal from the x-direction sensor (capacitors formed by the common electrode plate 3 and the split electrodes $4a_1$, $4a_2$, and by the common electrode plate 3 and the split electrodes $4c_1$, $4c_2$) are input to an adder 40 such that the deviation in the x-direction is output. The deviation is added to the deviation in the direction of θ in an adder 42. The linear actuator LA1 will be driven based on the resultant output as a value of $X_1$. The deviation in the x-direction output from the adder 40 is inversed by an inverting unit 41 so as to be added to the deviation in the direction of θ in an adder 44. The linear actuator LA2 is driven based on the resultant output as a value of $X_2$.

A y-direction command and a signal from a y-direction sensor (capacitors formed by the common electrode plate 3 and the split electrodes $4b_1$, $4b_2$, and by the common electrode plate 3 and the split electrodes $4d_1$, $4d_2$) are input to an adder 4. Adders 47 and 49, and an inverting unit 46 operate in the same way as in the case of x-direction to drive the linear actuators LA3 and LA4, respectively to output values of $Y_1$ and $Y_2$.

A θ-direction command and a signal from a θ-direction sensor are input to an adder 48. The resultant deviation is input to the adders 42, 44, 47 and 49, respectively so as to be added to each of the deviations in the x and y directions. The linear actuators LA1, LA2, LA3 and LA4 are driven. In the case where the movable stage 1 is moved in the x or y direction, the correction is made to prevent the movable stage 1 from turning in the θ-direction for the purpose of avoiding its movement caused by the turning oscillation. In order to turn the movable stage 1, the deviation in the θ-direction is output from the adder 48, and added to the adders 42, 44, 47 and 49, respectively. However, the control is executed (corrected not to be moved in the x and y directions) such that no deviation from the x and y directions occurs.

Figure 9:
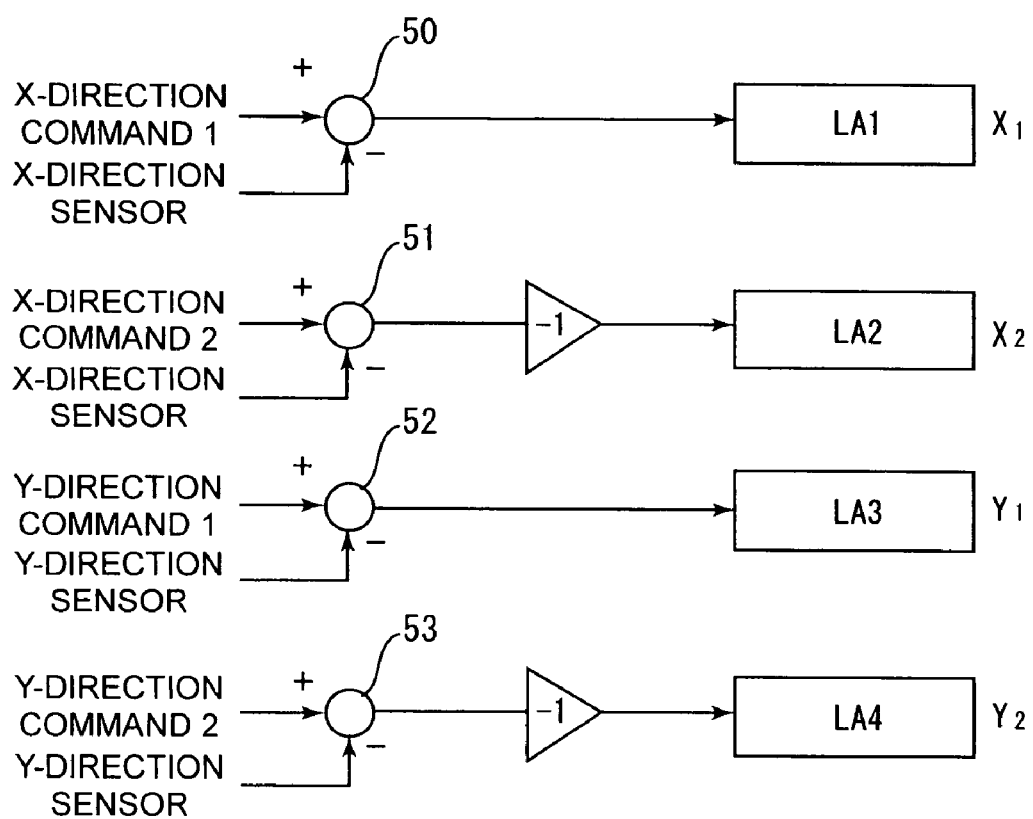
FIG. 9 shows the feedback circuit for an individual control of the planar motor according to the embodiment of the present invention.

FIG. 9 is a view of a feedback circuit for independent control of the planar motor according to the embodiment of the present invention. The independent control feedback is executed for controlling the respective linear actuators LA1 to LA4 individually. The x-direction command and the signal from the x-direction sensor (capacitor formed by the common electrode 29 and the split electrodes $32a_1$, $32a_2$) are input to an adder 50. The resultant deviation is input to the linear actuator LA1 so as to be driven. Likewise, x-direction command and the x-direction sensor (capacitor formed by the common electrode 29 and the split electrodes $32c_1$, $32c_2$) are input to an adder 51. The resultant deviation is input to the linear actuator LA2 so as to be driven.

The y-direction command and a signal from the y-direction sensor (capacitor formed by the common electrode 29 and the split electrodes $32b_1$ and $32b_2$) are input to an adder 52. The resultant deviation is input to the linear actuator LA3 so as to be driven. Likewise, the y-direction command and a signal from the y-direction sensor (capacitor formed by the common electrode 29 and the split electrodes $32d_1$ and $32d_2$) are input to an adder 53. The resultant deviation is input to the linear actuator LA4 so as to be driven.

The positional control may be executed with respect to the respective displacement and turning amounts in the X-axis and Y-axis directions in ranges of 5 mm and 5°, for example.

In the embodiment, four linear actuators are mounted at the respective side ends of the main base. However, four linear actuators may be mounted at the side surfaces of the main base.

In the embodiment, a single steel ball is interposed between ball bearings formed on the lower surface of the movable stage and the upper surface of the split electrode base for supporting the movable stage on the electrode base so as to be movable on the plane surface. However, a plurality of the steel balls may be used.

The member interposed between the split electrode base and the movable stage may be formed of the slidably movable member that exhibits high hardness.

In the embodiment, the linear actuators are mounted on the main base. However, they may be mounted on the movable stage.

What is claimed is:

1. A planar motor comprising:
   a movable stage;
   a common electrode plate including an electrode block in a crisscross arrangement to move on a plane together with the movable stage;
   a split electrode plate apart from the common electrode plate at a predetermined interval, which is formed of a plurality of pairs of electrode blocks that face the electrode blocks of the common electrode plate;
   a main base to which the split electrode plate is attached;
   a plurality of linear actuators attached to the main base; and
   a transmission mechanism that transmits displacement amounts of output shafts of the plurality of the linear actuators, wherein
   a differential structure is provided in which electrostatic capacities of two capacitors formed of a pair of the electrode blocks of the split electrode plate, which face the electrode blocks of the common electrode plate are kept unchanged with respect to a movement in an axial direction of the capacitors, and one of the electrostatic capacities is increased while the other is decreased in proportion to a displacement of the movement with respect to the other axial direction; and
   the plurality of linear actuators are driven to perform one of driving the movable stage in a direction of an X-axis and a Y-axis, and of turning the movable stage so as to output a change in the electrostatic capacity between the split electrode plate and the common electrode plate in accordance with the movement of the movable stage; and
   wherein the transmission mechanism includes:
   a bearing attached to an output shaft of the linear actuator having a turning axis vertical to the plane on which the movable stage moves;
   a bearing guide attached to the movable stage, against which the bearing is pressed; and
   an elastic member set between the main base and the bearing guide to apply an urging force that presses the bearing against the bearing guide.

2. The planar motor according to claim 1, wherein
   four units of the linear actuators are used, which are arranged at each side end of the main base; and
   the bearing guide is attached to each of four ends of the movable stage corresponding to the four respective linear actuators, and the bearing attached to each of the output shaft of the four linear actuators abuts against the bearing guide attached to each of the four ends of the movable stage.

3. The planar motor according to claim 2, wherein
   two opposite linear actuators among the four linear actuators are arranged symmetrically with respect to a center of the main base to have the output shafts opposite with each other; and
   when the output shafts of the two opposite linear actuators are driven in a same direction, the movable stage is linearly moved in one of directions of X-axis and Y-axis, and when the output shafts are driven in opposite directions, the movable stage is turned.

4. The planar motor according to claim 1, comprising at least a portion of a comparative arithmetic circuit that calculates displacements in directions of X-axis, Y-axis and turning based on the electrostatic capacity of all the capacitors formed between the common electrode plates and the split electrode plates, wherein a positional control with respect to the directions of X-axis, Y-axis and turning is executed based on each displacement output from the comparative arithmetic circuit.

5. The planar motor according to claim 3, comprising at least a portion of a comparative arithmetic circuit that calculates displacements in directions of X-axis, Y-axis and turning based on the electrostatic capacity of all the capacitors formed between the common electrode plates and the split electrode plates, wherein a positional control with respect to the directions of X-axis, Y-axis and turning is executed based on each displacement output from the comparative arithmetic circuit.

6. The planar motor according to claim 1, comprising at least a portion of a comparative arithmetic circuit that calculates displacements in directions of X-axis and Y-axis based on the electrostatic capacity of all the capacitors formed between the common electrode plates and the split electrode plates, wherein a positional control with respect to the directions of X-axis and Y-axis is executed based on each displacement output from the comparative arithmetic circuit.

7. The planar motor according to claim 3, comprising at least a portion of a comparative arithmetic circuit that calculates displacements in directions of X-axis and Y-axis based on the electrostatic capacity of all the capacitors formed between the common electrode plates and the split electrode plates, wherein a positional control with respect to the directions of X-axis and Y-axis is executed based on each displacement output from the comparative arithmetic circuit.

* * * * *